United States Patent [19]
Hale et al.

[11] Patent Number: 5,878,371
[45] Date of Patent: Mar. 2, 1999

[54] METHOD AND APPARATUS FOR SYNTHESIZING SITE-SPECIFIC FARMING DATA

[75] Inventors: George H. Hale, Naperville; Keith W. Wendte, Lemont; Paul W. Haack, Crystal Lake, all of Ill.

[73] Assignee: Case Corporation, Racine, Wis.

[21] Appl. No.: 753,335

[22] Filed: Nov. 22, 1996

[51] Int. Cl.$^6$ .................................................. G06F 19/00
[52] U.S. Cl. .................................................. 702/5
[58] Field of Search .................. 702/2, 3, 5; 701/210, 701/214, 216, 221; 460/1, 8; 56/10.2 R, 10.2 A, 10.2 G

[56] References Cited

U.S. PATENT DOCUMENTS

| | | |
|---|---|---|
| Re. 35,100 | 11/1995 | Monson et al. . |
| 4,578,678 | 3/1986 | Hurd . |
| 4,630,773 | 12/1986 | Ortlip . |
| 4,675,676 | 6/1987 | Takanabe et al. . |
| 4,736,303 | 4/1988 | Itoh et al. . |
| 4,792,907 | 12/1988 | Ikeda et al. . |
| 4,949,268 | 8/1990 | Nishikawa et al. . |
| 5,075,693 | 12/1991 | McMillan et al. ............ 701/207 |
| 5,084,822 | 1/1992 | Hayami . |
| 5,214,757 | 5/1993 | Mauney et al. . |
| 5,220,509 | 6/1993 | Takemura et al. . |
| 5,282,389 | 2/1994 | Faivre et al. . |
| 5,396,431 | 3/1995 | Shimizu et al. . |
| 5,398,034 | 3/1995 | Spilker, Jr. . |
| 5,416,712 | 5/1995 | Geier et al. . |
| 5,421,416 | 6/1995 | Orbach et al. . |
| 5,428,544 | 6/1995 | Shyu . |
| 5,440,484 | 8/1995 | Kao . |
| 5,452,211 | 9/1995 | Kyrtsos et al. . |
| 5,455,769 | 10/1995 | Panoushek et al. . |
| 5,467,271 | 11/1995 | Abel et al. . |
| 5,469,158 | 11/1995 | Morita . |
| 5,490,073 | 2/1996 | Kyrtsos . |
| 5,497,149 | 3/1996 | Fast . |
| 5,510,798 | 4/1996 | Bauer . |
| 5,517,419 | 5/1996 | Lanckton et al. . |
| 5,523,765 | 6/1996 | Ichikawa . |
| 5,525,998 | 6/1996 | Geier . |
| 5,526,002 | 6/1996 | Gudat et al. . |
| 5,526,291 | 6/1996 | Lennen . |
| 5,606,850 | 3/1997 | Nakamura ............ 56/10.2 A |
| 5,666,793 | 9/1997 | Bottinger ............ 56/10.2 R |

FOREIGN PATENT DOCUMENTS

| | | |
|---|---|---|
| 0 702 891 A1 | 3/1996 | European Pat. Off. . |
| 43 42 171 A1 | 5/1994 | Germany . |

OTHER PUBLICATIONS

R. Eatock and M.R. Inggs, The Use of Differential GPS in Field Data Extraction and Spatially Variable Fertilizer Application, Proceedings of 1994 IEEE International Geoscience and Remote Sensing Symposium, pp. 841–843.

France Paquet and Dr. Alain A. Viau, Integration of Remote Sensing, Meteorological and Physiographic Data for the Delimitation of Agrometeorological Homogeneous Zones, Proceedings of 1995 IEEE International Geoscience and Remote Sensing Symposium, pp. 303–305.

(List continued on next page.)

*Primary Examiner*—Donald E. McElheny, Jr.
*Attorney, Agent, or Firm*—Foley & Lardner

[57] ABSTRACT

A site-specific farming system which performs various functions while remaining relatively unaffected by spurious farming data is disclosed. The farming data may be received in real-time from location signal generation and sensing circuits, or may be received from a digital memory which stores the farming data. The farming data includes both valid and spurious farming data which are identified by integrity checking the data. Existing relationships which exist within the valid farming data are exploited to generate synthesized farming data used to replace the spurious farming data. The valid and synthesized farming data are used to perform a function of the farming system such as performing a statistical analysis of the farming data, generating an electronic display of the farming data, generating a prescription map, or generating variable rate application signals.

47 Claims, 6 Drawing Sheets

OTHER PUBLICATIONS

Brochure: *Advanced Farming Systems*, ©1996 Case Corporation.

Brochure: *John Deere Greenstar Combine Yield–Mapping System*, John Deere (no date).

Report No. 94–D–139, *Site Specific Yield Measurement in Combines and Forage Harvesting Machines*, Ageng—Milano '94.

*The Use of GPS in Agriculture for Yield Mapping and Tractor Implement Guidance*, DGPS '91 Symposium, vol. II, Seite 455–465.

*Yield Monitoring Experiences—1994*, ASAE Winter Meeting, Atlanta, GA, Dec. 16, 1994.

*Six–Ply Precision Layers of Computerized Information Allow Fine–Tuned Crop Production*, Top Producer/Jan. 1995.

*Farming with Satellites the Future of Farming?*, FarmWeek, p. 3, Monday, Feb. 24, 1992.

*Field Positioning Technology*, Soybean Digest, HiTech Tools, pp. 23–25, Winter 1992.

*Tools with Eyes*, Farm Journal/Mid–Mar., 1989.

*Data Acquisition for Yield Mapping with Combine Harvesters* Computers in Agriculture, ASAE 1994.

*Accuracy from AFAR*, Top Producer/Feb. 1992.

*Accuracy to the Inch*, Top Producer/Jan. 1995.

*Sensing and Mapping Grain Yield Variation*, Automated Agriculture for the $21^{st}$ Century, ASAE Pub. 11–91.

*Robotics and Intelligent Machines in Agriculture*, ASAE—Prceedings—the First International Conference on Robits . . . —Oct. 2–4, 1983.

*Control Concepts for Tillage Systems*—Robert L. Schafer—Dec. 1981.

*Control System for Combine Harvesters*—Report by Kotyk et al.

Brochure: *Introducing the Greenstar Combine Yeild–Mapping System*(what is the Greenstar Combine Yeild–Mapping System?) (no date).

Brochure: *Hiniker 8150 Control System—The Simple and Economical Solution To Accurate Chemical and Fertilizer Application* (no date).

Brochure: *Hiniker 8200 Monitor—The Most Versatile Low Cost Acre Monitor on the Market* (no date).

*Site Specific Farming's Second Wave*—Bryce Knorr; Mar. 1995.

3rd International Conference on *Land Vehicle Navigation*—Prof. Dr. Kurt Biedonkopf; 14–16 Jun. 1994.

*Data Acquisition for Yield Mapping with Combine Harvesters*—P. Reitz and H.D. Kutzbach.

*Global Positioning System Applications*—Al Demmler; Apr. 1994.

*Where in the World?*—Ron Harbour; AgMapping Jun. 1991.

| DATA POINT NO. | BU /ACRE | MOISTURE | LONGITUDE | LATITUDE | ... |
|---|---|---|---|---|---|
| 1 | 32.0739 | 17.7 | −88.7291520 | 39.0710720 | |
| 2 | 56.5808 | 18.1 | −88.7291140 | 39.0710720 | |
| 3 | 64.1104 | 17.1 | −88.7290720 | 39.0710740 | |
| 4 | 96.1741 | 16.4 | −88.7290320 | 39.0710760 | |
| 5 | 105.247 | 15.9 | −88.7289890 | 39.0710740 | |
| . | . | . | . | . | |
| . | . | . | . | . | |
| . | . | . | . | . | |

300

METHOD AND APPARATUS FOR SYNTHESIZING SITE-SPECIFIC FARMING DATA

FIELD OF THE INVENTION

The present invention relates to performing a function of a site-specific farming system in response to site-specific farming data including valid and spurious farming data. In particular, the invention relates to integrity checking received site-specific farming data to identify the valid and the spurious farming data, generating synthesized farming data based upon the valid farming data and replacing the spurious farming data with synthesized farming data, and performing a function of the farming system based upon the valid and the synthesized farming data.

BACKGROUND OF THE INVENTION

Research within the agricultural community has shown that management of crop production may be optimized by taking into account spatial variations that often exist within a given farming field. For example, by varying the farming inputs applied to a field according to local conditions within the field, a farmer can optimize crop yield as a function of the inputs being applied while preventing or minimizing environmental damage. This management technique has become known as precision, site-specific, prescription or spatially-variable farming.

The management of a field using precision farming techniques requires the gathering and processing of data relating to site-specific characteristics of the field. Generally, site-specific input data is analyzed in real-time or off-line to generate a prescription map including desired application or control rates of a farming input. A control system reads data from the prescription map and generates a control signal which is applied to a variable-rate controller adapted to apply a farming input to the field at a rate that varies as a function of the location. Variable-rate controllers may be mounted on agricultural vehicles with attached variable-rate applicators, and may be used to control application rates for applying seed, fertilizer, insecticide, herbicide or other inputs. The effect of the inputs may be analyzed by gathering site-specific yield and moisture content data and correlating this data with the farming inputs, thereby allowing a user to optimize the amounts and combinations of farming inputs applied to the field.

The spatially-variable characteristic data may be obtained by manual measuring, remote sensing, or sensing during field operations. Manual measurements typically involve taking a soil probe and analyzing the soil in a laboratory to determine nutrient data or soil condition data such as soil type or soil classification. Taking manual measurements, however, is labor intensive and, due to high sampling costs, provides only a limited number of data samples. Remote sensing may include taking aerial photographs or generating spectral images or maps from airborne or spaceborne multispectral sensors. Spectral data from remote sensing, however, is often difficult to correlate with a precise position in a field or with a specific quantifiable characteristic of the field. Both manual measurements and remote sensing require a user to conduct an airborne or ground-based survey of the field apart from normal field operations.

Spatially-variable characteristic data may also be acquired during normal field operations using appropriate sensors supported by a combine, tractor or other vehicle. A variety of characteristics may be sensed including soil properties (e.g., organic matter, fertility, nutrients, moisture content, compaction, topography or altitude), crop properties (e.g., height, moisture content or yield), and farming inputs applied to the field (e.g., fertilizers, herbicides, insecticides, seeds, cultural practices or tillage parameters and techniques used). Other spatially-variable characteristics may be manually sensed as a field is traversed (e.g., insect or weed infestation or landmarks). As these examples show, characteristics which correlate to a specific location include data related to local conditions of the field, farming inputs applied to the field, and crops harvested from the field.

The acquisition of site-specific farming data during normal field operations, however, may be subject to intermittent conditions which cause spurious farming data. For example, positioning signals transmitted to an agricultural vehicle from satellites or a ground station may be temporarily blocked or shadowed by trees, forest boundaries, buildings, or topographical features (e.g., mountains). Electrical noise (e.g., caused by a change in load on a vehicle's power system) may interfere with characteristic or location signals. Intermittent faults in a vehicle's wiring or connectors may also cause spurious characteristic or location data. Spurious farming data caused by these and other conditions are likely given the harsh environment in which agricultural vehicles typically operate.

Spurious farming data may interfere with various functions of a site-specific farming system. For example, spurious farming data may adversely affect the performance of a statistical analysis of the farming data (e.g., the determination of the average yield or moisture content of an area of a field), the generation of an electronic map showing visible indicia of a characteristic (e.g., the generation of a yield map), the generation of a prescription map based upon the farming data, or the generation of variable-rate application signals based upon the farming data.

In view of the foregoing, it would be desirable to provide a site-specific farming system which adequately accommodates spurious farming data. Furthermore, it would be desirable to provide a site-specific farming system which handles an intermittent loss of location data without switching to a dead-reckoning system to determine the current location of a vehicle based upon a last valid location, a sensed speed and a sensed direction. Such dead reckoning systems require extra sensors to sense parameters such as direction, which increase the cost and complexity thereof. In addition, such a dead reckoning based system does not accommodate spurious characteristic data, and does not efficiently use information and relationships which exist in valid site-specific farming data that has been collected.

SUMMARY OF THE INVENTION

Accordingly, the present invention performs a function of a site-specific farming system in response to site-specific farming data including valid and spurious farming data without significant adverse effect due to the spurious farming data. The farming data may be received in real-time from location signal generation and sensing circuits, or may be received from a digital memory which stores the farming data. The farming system identifies the valid and the spurious farming data by integrity checking the data. Existing relationships within the valid farming data are used to generate synthesized farming data which replaces the spurious farming data without the need for redundant sensors. The valid and the synthesized farming data are used to perform a function of the farming system such as performing a statistical analysis of the farming data, generating an electronic display representing the farming data, generating a prescription map, or generating variable rate application signals. The use of synthesized farming data causes the functions to be performed without a significant adverse effect due to the spurious farming data.

One embodiment of the present invention provides a method of performing a function of a site-specific farming system in response to site-specific farming data. The farming data includes characteristic data representative of a spatially-variable characteristic of an agricultural field at a plurality of locations within the field and location data representative of the plurality of locations. The farming data also includes valid farming data and spurious farming data. The method includes the steps of receiving the site-specific farming data from a source, integrity checking the received site-specific farming data to identify the valid farming data and the spurious farming data, generating synthesized farming data based upon the valid farming data and replacing at least a portion of the spurious farming data with the synthesized farming data, and performing the function of the site-specific farming system in response to the valid farming data and the synthesized farming data.

Another embodiment of the present invention provides an apparatus for performing a function of a site-specific farming system in response to site-specific farming data. The farming data includes characteristic data representative of a spatially-variable characteristic of an agricultural field at a plurality of locations within the field and location data representative of the plurality of locations. The farming data also includes valid farming data and spurious farming data. The apparatus includes means for receiving the site-specific farming data from a source, means for integrity checking the received site-specific farming data to identify the valid farming data and the spurious farming data, means for generating synthesized farming data based upon the valid farming data and replacing at least a portion of the spurious farming data with the synthesized farming data, and means for performing the function of the site-specific farming system in response to the valid farming data and the synthesized farming data.

Another embodiment of the present invention provides a method of performing a function of a site-specific farming system in response to site-specific farming data. The farming data includes characteristic data representative of a spatially-variable characteristic of an agricultural field at a plurality of locations within the field and location data representative of the plurality of locations. The characteristic data includes valid characteristic data and spurious characteristic data and the location data includes valid location data and spurious location data. The method includes the steps of receiving the characteristic data and the location data from at least one source, integrity checking the received characteristic data to identify the valid characteristic data and the spurious characteristic data, integrity checking the received location data to identify the valid location data and the spurious location data, generating synthesized characteristic data based upon the valid characteristic data and replacing at least a portion of the spurious characteristic data with the synthesized characteristic data, generating synthesized location data based upon the valid location data and replacing at least a portion of the spurious location data with the synthesized location data, and performing the function of the site-specific farming system in response to the valid characteristic data, the synthesized characteristic data, the valid location data and the synthesized location data.

BRIEF DESCRIPTION OF THE DRAWINGS

The invention will become more fully understood from the following detailed description, taken in conjunction with the accompanying drawings, wherein like reference numerals refer to like parts, in which.

DETAILED DESCRIPTION OF THE PREFERRED EMBODIMENTS

Figure 1:
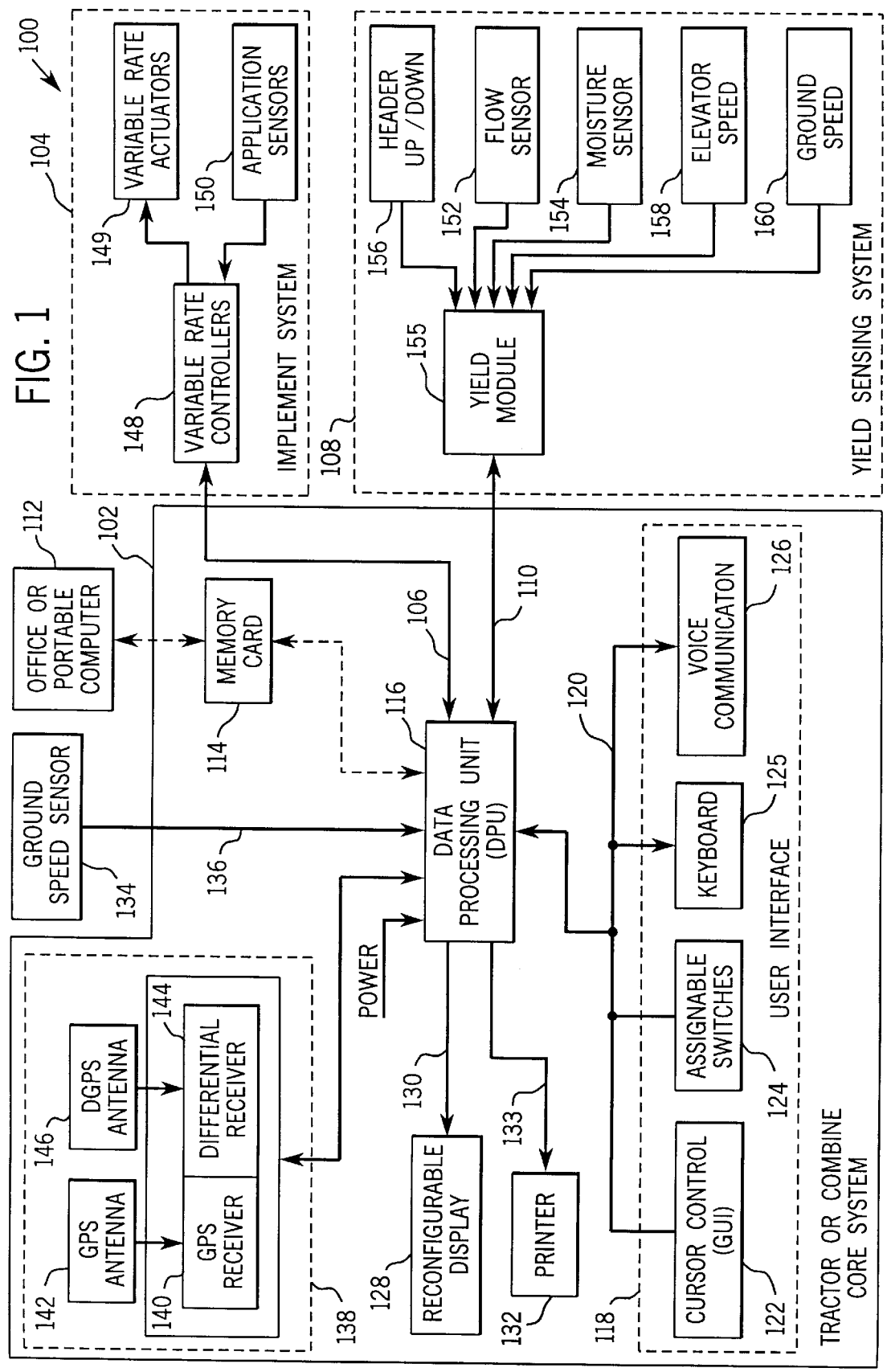
FIG. 1 is a block diagram illustrating a site-specific farming system including vehicles equipped with sensors for sampling site-specific characteristics of a field and electronic displays for displaying visible indicia of the characteristics in the vehicle cabs, and also showing an office or portable computer.

Referring to FIG. 1, a site-specific farming system 100 includes one or more core systems 102 which provide data processing functions for different agricultural vehicles including tractors and combines. In farming system 100, each tractor or combine is equipped with its own core system 102. Each tractor is also equipped with an implement system 104 appropriate for the task at hand, and core system 102 of the tractor communicates with implement system 104 over bus 106. Similarly, each combine is also equipped with a yield sensing system 108, and core system 102 of the combine communicates with yield sensing system 108 over bus 110.

Preferably, core system 102 is removable and can be installed on a variety of agricultural vehicles. When installed on a tractor equipped with implement system 104, core system 102 can be configured to operate in an "apply" mode wherein it collects, controls, records and displays application rate data. The displayed data may include either the desired application rate data (e.g., the prescription map) or the actual application rate data (e.g., the sensed feedback). When installed on a combine equipped with yield sensing system 108, core system 102 can be configured to operate in a "harvest" mode wherein it collects, records and displays harvest data (e.g., yield or moisture content). Core system 102 may also operate in a "scout" mode wherein it records and displays indicia (i.e. graphic symbols) representative of data observed and entered by an operator. Core system 102 may also provide directional or positional assistance during scouting or when collecting soil samples. Sensing and control functions that require specialized input and output processing are performed outside core system 102.

Farming system 100 also includes a workstation or personal computer 112 which may be located in the farm office or may be portable. A medium of communication is used to transfer site-specific data between core system 102 and computer 112. Preferably, core system 102 and computer 112 each include a read/write interface (not shown) for a removable memory card 114 which can be transported between core system 102 and computer 112. Memory cards 114 may be Type II PCMCIA cards made by Centennial Technologies, Inc. However, other mediums of communication (e.g., floppy or hard disk, RF, infrared, RS-232/485 links, etc.) may be used. Memory card 114 is used to transfer site-specific characteristic data from core system 102 to computer 112, and to transfer prescription maps from computer 112 to core system 102.

Core system 102 includes a digital data processing unit (DPU) 116 which communicates with the vehicle operator through a user interface 118 via links 120 (e.g., an RS-232/485 interface; a standard keyboard interface). DPU 116 includes a processor (e.g., a 486DX or Pentium® microprocessor) and various types of memory which may include non-volatile memory (PROM, EEPROM or FLASH) and volatile memory (RAM). The processor executes a program stored in the non-volatile memory and the volatile memory (RAM) may include a battery back-up circuit. Alternatively, DPU 116 may be implemented using dedicated, specific purpose equipment or hard-wired logic circuitry. User interface 118 includes a graphical user interface (GUI) 122 providing cursor control (e.g., a mouse, joystick or four-way switch with up, down, right and left positions), assignable switches 124 (e.g., push buttons) configurable by the processor, a keyboard 125, and a voice-communication interface 126.

DPU 116 is configured to generate display signals which are applied to a reconfigurable display 128 (e.g., a CRT, flat screen LCD display) via communication link 130. Display 128 is preferably an active-matrix LCD capable of displaying full-motion video and a number of colors under varying ambient light conditions. Display 128 is also capable of displaying graphics and alpha-numeric characters. Display 128 is used, inter alia, to display the current configurations of assignable switches 124. DPU 116, user interface 118 and display 128 are located in the vehicle cab such that the operator has easy access to user interface 118 and an unobstructed or substantially unobstructed view of display 128. Core system 102 may also include a printer 132 in the cab which communicates with DPU 116 via an interface 133 (e.g., an RS-232 link).

DPU 116 receives signals representing the speed of the vehicle from ground speed sensor 134 via interface 136 (e.g., a frequency interface). Ground speed sensor 134 may include a magnetic pickup sensor configured to sense the speed of the vehicle's wheels or transmission, or may include a radar device mounted to the body of the vehicle. The speed signals may be used by DPU 116 to calculate distance travelled as described below.

DPU 116 also communicates with a location signal generation circuit 138 which generates location signals representing the vehicle's position. Circuit 138 includes a global positioning system (GPS) signal receiver 140 with an associated antenna 142, and a differential GPS (DGPS) signal receiver 144 with an associated antenna 146. A single antenna may be used in place of antennas 142 and 146. GPS receiver 140 may, for example, be manufactured by Trimble Navigation Ltd. of California, and DGPS receiver 144 may be manufactured by Satloc, Inc. of Arizona. GPS receiver 140 determines longitude and latitude coordinates (and altitude) of the vehicle from signals transmitted by the GPS satellite network. The accuracy of the position data is improved by applying correction signals received by DGPS receiver 144. The differential correction signals are used to correct errors present on GPS signals including the selective availability error signal added to GPS signals by the U.S. government. DPGS correction signals are transmitted by the U.S. Coast Guard and by commercial services. For example, the Omnistar DGPS system from John E. Chance & Assoc. of Texas includes a network of ten land-based differential reference stations which send correction signals to a master station which uploads signals to a satellite for broadcast throughout North America. GPS differential correction signals may also be transmitted from a local base station such as the top of a building. In a preferred embodiment, DPU 116 interfaces with the SATLOC L-Band Integrated TerraStar DGPS System via an RS-485 communication link.

When core system 102 is mounted on a tractor, DPU 116 communicates with implement system 104 via bus 106. Implement system 104 may include one or more variable-rate controllers 148, variable-rate actuators 149 and application sensors 150. DPU 116 reads application rate data for a particular field location from a prescription map (which may be supplied by computer 112), or reads an input device such as a potentiometer (not shown) used to manually set a desired application rate, and generates commands which are sent to variable-rate controllers 148. The command output rate is a function of the speed of the tractor and the desired application rate. For example, an increased speed will require an increased output rate to maintain a constant desired application rate. In response, controllers 148 generate control signals which are applied to variable-rate actuators 149. Application sensors 150 provide feedback signals representing the actual application rates to enable closed-loop control. Variable-rate application systems include, for example, a variable-rate planter controller from Rawson Control Systems of Iowa and a variable-rate fertilizer spreader from Soil Teq., Inc. of Minnesota. Bus 106 may be an RS-485 bus for a single-channel variable-rate controller, or a J-1939 implement bus for a multiple-channel controller.

The tractor may also include site-specific sensors configured to sense characteristics of a field during field operations and communicate the information to DPU 116, even if the tractor is not equipped with variable-rate controllers. For example, a tractor pulling a plow may be equipped with sensors for monitoring site-specific characteristics (e.g., draft force; implement position) as a field is worked. A tractor with a hitch assembly control system with various sensors is described in U.S. Pat. No. 5,421,416, commonly assigned and incorporated herein by reference. A tractor, as used herein, includes various agricultural vehicles attached to implements such as planters, spreaders or fertilizers.

Desired application rate signals from a prescription map, actual application rate signals from feedback sensors 150, or signals from another site-specific sensor supported by the tractor may be processed by DPU 116 to form data representative of the respective characteristic. This characteristic data may be correlated with location data representative of the location signals received from location signal generation circuit 138, and the correlated data stored in memory card 114 or in another memory.

When core system 102 is mounted on a combine, DPU 116 communicates with yield sensing system 108 via link 110, which may carry RS-232/485 signals. Yield sensing system 108 typically includes a yield flow sensor 152 and a moisture sensor 154. Yield flow sensor 152 may include an impact-type mass flow rate sensor attached to a steel plate which is struck by grain passing through the clean-grain elevator of the combine to measure the force of the grain flow. Moisture sensor 154 may be a capacitive-type sensor mounted on the underside of the grain tank loading auger of the combine to measure the moisture content of grain passing near the sensor. Moisture sensor 154 may include a grain temperature sensor to compensate the grain moisture signals for temperature. DPU 116 receives sensed signals from flow sensor 152 and moisture sensor 154, and receives location signals from location signal generation circuit 138 which represent the positions of the combine where grain flow and moisture content were sampled. The grain flow and moisture content signals are processed to form data representative of the respective characteristic, and this data is correlated with location data representative of the location signals. Correlated data is stored in memory card 114 or in another memory.

To convert the grain flow signals into yield data, the distance travelled by the combine is determined by multiplying the combine's speed by elapsed time. The speed may be based upon signals sensed by speed sensor 134, or may be determined by calculating the difference between successive position signals received from location signal generation circuit 138 and dividing by elapsed time. The yield (e.g., bu/acre) is determined by dividing the quantity of sensed grain (e.g., bu) by the area of the field harvested (e.g., acres), wherein the quantity of sensed grain is the product of the grain flow rate and time, and the area is the product of the width of cut and distance travelled.

In one embodiment, DPU 116 receives RS-485 serial communication signals from a yield module unit (YMU) 155 which is configured to perform data processing for yield sensing system 108. A separate YMU off-loads data processing functions from DPU 116, and minimizes wiring between the combine and the DPU. YMU 155 receives sensed signals from flow sensor 152, moisture sensor 154, a header up/down sensor 156, an elevator speed sensor 158 and a ground speed sensor 160. Header up/down sensor 156 senses the position of the combine's header to detect whether the combine is harvesting. When header position is above a pre-programmed value, YMU 155 assumes the combine is not harvesting and yield information is not calculated. A system for controlling and displaying the status of a combine header is described in U.S. Pat. No. 5,465,560, commonly assigned and incorporated herein by reference. Elevator speed sensor 158 senses the speed of the clean grain elevator to determine the speed at which grain passes through the elevator. Signals from sensor 158 may be used to compensate the yield calculations for the delay before harvested grain is sensed. Ground speed sensor 160 senses ground speed of the combine, and may be the same as ground speed sensor 134, or similar to it.

YMU 155 uses signals from sensors 152, 154, 156, 158 and 160 to calculate and communicate yield and moisture content data to DPU 116 via bus 110. The update rate at which data is communicated may be once per second. YMU 155 may provide instantaneous yield and moisture content data, and may also provide field and load total (summary) values for grain weight, wet and dry bushels, average moisture, area harvested and dry yield. Thus, YMU 155 allows specific yield processing functions to be moved from DPU 116. Alternatively, YMU 155 may send raw sensed data to DPU 116 and the DPU may perform the calculations. However, farming system 100 could also be configured such that DPU 116 reads the signals directly from the sensors.

Core system 102 may communicate with other vehicle systems over a vehicle data bus (not shown). Preferably, the vehicle data bus conforms to the standards of SAE J-1939 ("Recommended Practice for a Serial Control and Communications Vehicle Network"). A bridge circuit may be used to facilitate the transfer of data between the vehicle data bus and a secondary implement bus coupled to implement system 104 and DPU 116. The bridge circuit may be used to filter data between busses, thereby decreasing bus loading.

Figure 2:
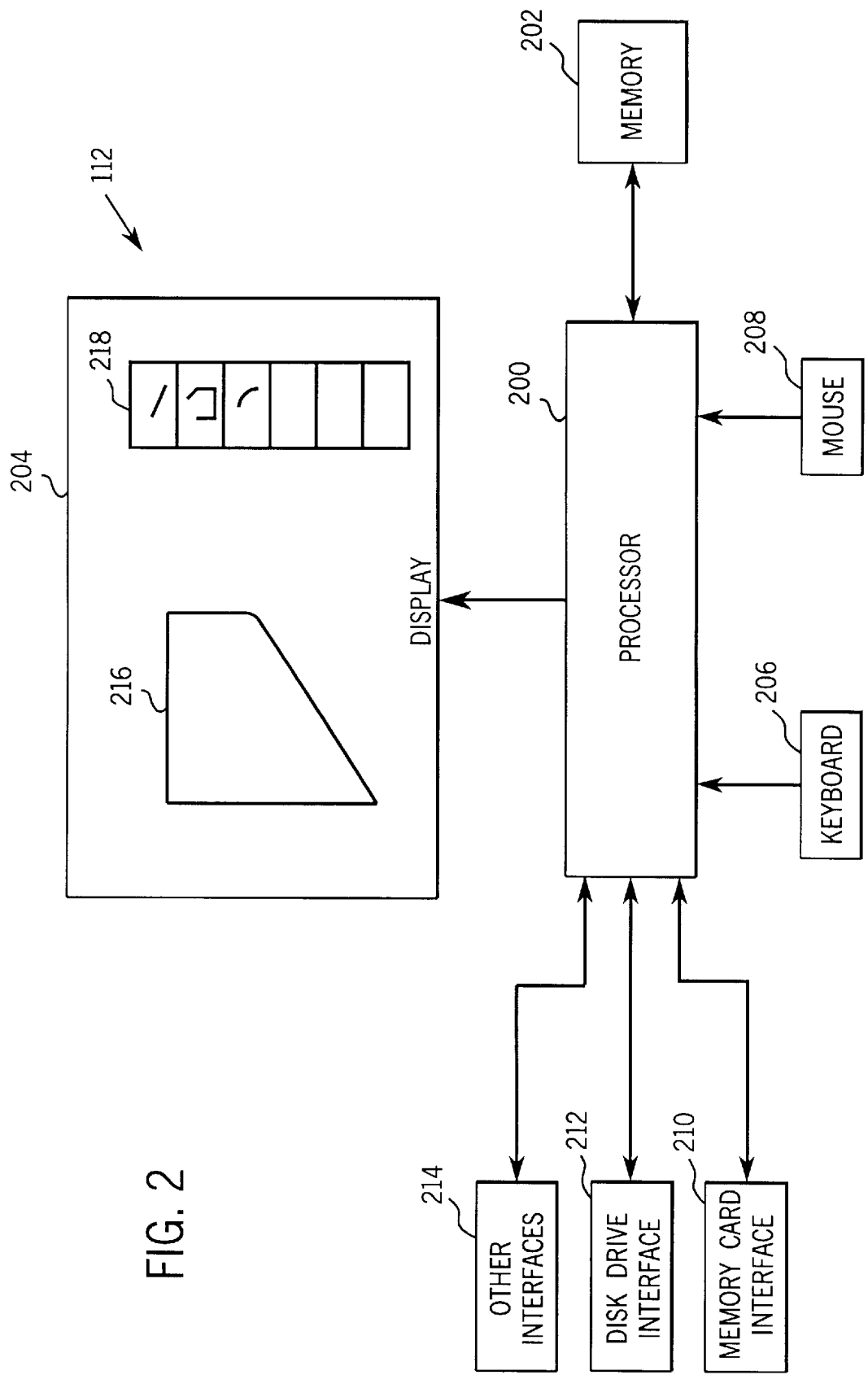
FIG. 2 is a block diagram of the office or portable computer shown in FIG. 1 which can be used to process site-specific farming data.

Referring to FIG. 2, computer 112 is preferably a programmed personal computer including a processor 200, a memory circuit 202, a color or monochrome display 204, input devices such as a keyboard 206 or a mouse 208, and input/output interfaces such as a memory card interface 210, a hard or floppy disk drive interface 212, and other interfaces 214 (e.g., RF or infrared). An input device such as a joystick, light pen or touch screen may also be used. Alternatively, computer 112 may be implemented using dedicated, specific-purpose equipment or hard-wired logic circuitry. Processor 200 may be an x86 or Pentium® microprocessor configured to execute a program stored in memory 202 or on a disk read by disk drive interface 212. Preferably, processor 200 reads precision farming data including position information from memory card 114 using memory card interface 210. Data may also be entered using keyboard 206, mouse 208, disk drive interface 212, or another interface 214.

Processor 200 generates display signals which, when applied to display 204, cause visual alpha-numeric and graphical indicia to be displayed. For example, the display signals may cause display 204 to create a visual map 216 of a field as well as icons 218 representing drawing tools in a toolbox. Preferably, display 204 is a color monitor, but it may also be a monochrome monitor capable of displaying different light intensity levels.

Figure 3:
FIG. 3 represents a layer of data representing a spatially-variable characteristic of a farming field stored in memory.

FIG. 3 generally represents the structure in which a layer of site-specific farming data representative of a characteristic of a farming field is stored in memory. The data structure may be referred to as a geo-referenced digital map, or a layer of data. The structure is preferably implemented using a database 300 (e.g., a geographical information system (GIS) database) represented by a table, wherein each row represents a characteristic data point taken at a location in the field. For example, a layer having 5000 data points is represented by a table having 5000 rows. Columns of information are associated with each data point. For example, the columns shown in FIG. 3 include yield data (bu/acre), moisture content data, and the longitude and latitude coordinates at which each data point was sampled. The data structure of FIG. 3 represents, for example, a yield layer. Data in the first row (Data Point No. 1) indicates that flow sensor 152 and moisture sensor 154 of the combine sensed grain flow corresponding to a yield of 32.0739 bu/acre and a moisture content of 17.7, respectively, at a location defined by longitude and latitude coordinates −88.7291520 and 39.0710720.

A similar structure may be used to store each layer of site-specific farming data. For example, a pH layer may include a row for each data point and columns for pH, longitude and latitude. Thus, memory card 114 may contain a layer of data for each site-specific characteristic of a field.

The data structure represented generally by FIG. 3 may include additional columns representing other spatially-variable data. For example, a harvest data structure may include the following fields:

| Data Item | Description |
| --- | --- |
| Longitude | Longitude position of data from GPS |
| Latitude | Latitude position of data from GPS |
| Flow Rate | Weight (wet) of grain passing by flow sensor 152 every second (e.g., lbs/sec) |
| Moisture | Percent (%) of grain weight which is moisture |
| GPS Time | Time stamp from GPS (sec) |
| Cycles | Seconds covered by the data (e.g., 1, 2 or 3) |

-continued

| Data Item | Description |
| --- | --- |
| Distance | Distance (inches) traveled since last data point |
| Swath | Width of cut of the header (inches) |
| Header Pos | 1 = header down; 0 = header up |
| Pass | Number of the pass through a field |
| Grain | Type of grain (e.g., corn) |
| GPS Status | 1 = good (>= 4 satellites); 2 = marginal (3 satellites); 3 = bad (<= 2 satellites) |
| Altitude | Altitude (feet) of data from GPS |

The data structure may also include heading information such as a vehicle identifier, a farm identifier, a field identifier, a load identifier, and a serial number for hardware components of farming system 100 (e.g., a yield module serial number). A similar data structure may be used to store application data. The harvest and application data structures are preferably stored as DOS files in memory card 114.

DPU 116 and processor 200 use correlated characteristic and location farming data to perform various functions of site-specific farming system 100. For example, DPU 116 or processor 200 use the correlated farming data to generate display signals which cause electronic display 128 or 204, respectively, to plot a map of a field which includes visible indicia of the characteristic data. DPU 116 typically plots the map in real-time as characteristic and location signals are received from the sensing circuits (e.g., flow sensor 152, moisture sensor 154, application sensors 150) and location signal generation circuit 138, respectively. However, DPU 116 may also plot a map off-line based upon farming data previously stored in memory. For example, if a harvest operation was stopped in mid-field on a previous day, DPU 116 may generate a yield map based on the previous day's yield data and continue plotting data on the yield map that is collected during the current day's operation. In contrast, processor 200 typically plots the map off-line based upon farming data received from memory card 114.

Figure 4:
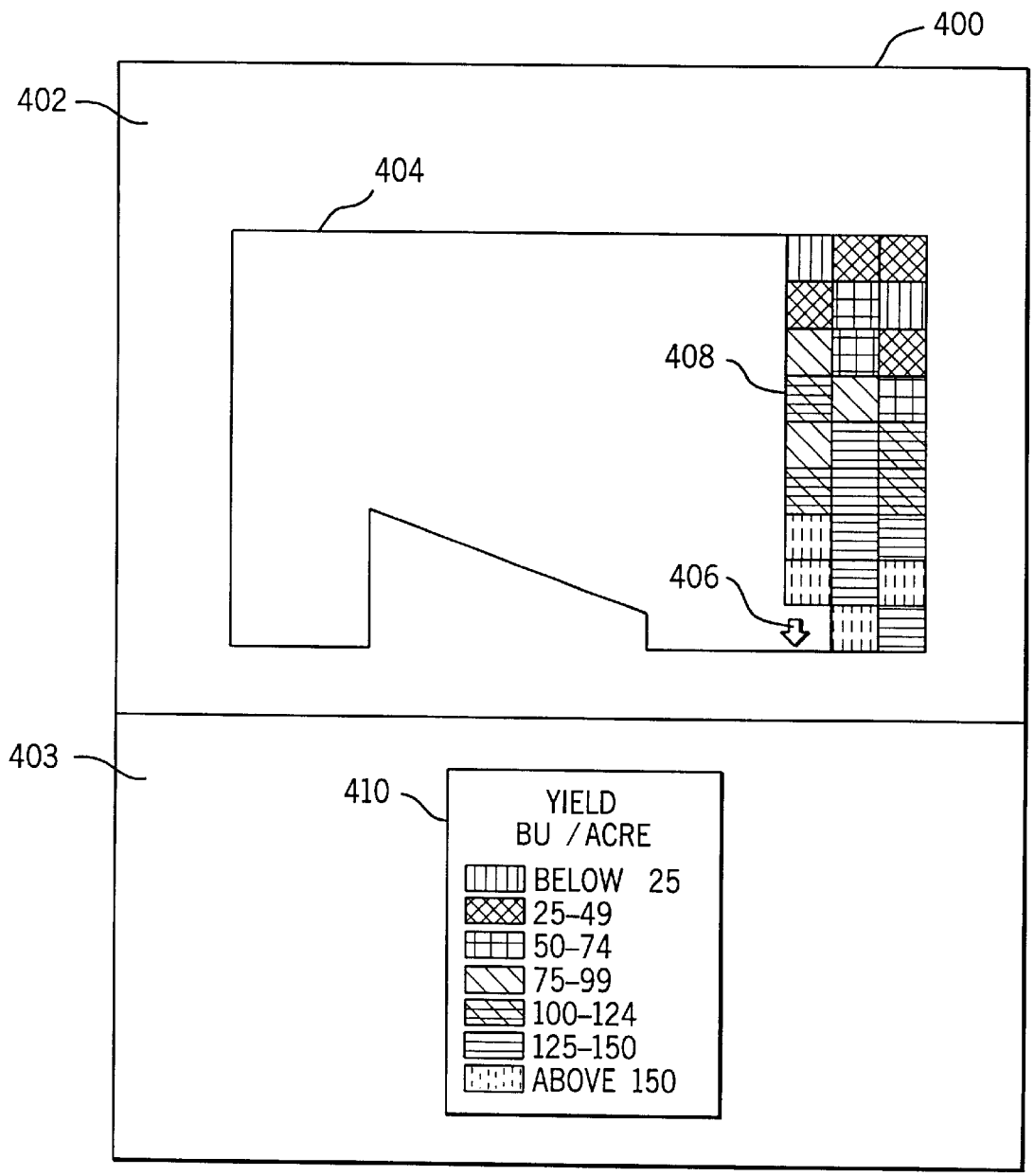
FIG. 4 shows a map of a farming field displayed on an electronic display in a vehicle cab which includes visible indicia of a characteristic of the field.

FIG. 4 represents an exemplary display when core system 102 is mounted on a combine equipped with flow sensor 152 and moisture sensor 154, the combine is harvesting grain, and DPU 116 is using the sensed data and correlated location data in real-time to plot a map of the field which includes visible indicia of the yield. A screen 400 of display 128 includes a map display area 402 and a legend display area 403. In this example, the boundaries of the field being harvested are defined and are stored in memory. After entering a "harvest" mode of operation in response to actuation of one of assignable switches 124, DPU 116 accesses the longitude and latitude coordinates of the field boundaries from memory and scales the field boundaries to correspond to a portion of map display area 402. DPU 116 scales the boundary data and produces display signals which, when applied to display 128, generate a visible map 404 of the field boundaries within map display area 402.

At the start of the harvest, the combine was located at the upper-right hand corner of map 404. The combine then made a number of passes through the field, turning at the headlands (located at the boundaries of map 404). The current location of the combine is marked by an icon 406, such as an arrow which also indicates the direction of travel. The three columns of blocks indicate that the combine has made three passes through the field. Throughout the harvest, DPU 116 gathers site-specific data sensed by flow sensor 152 and moisture sensor 154 and correlates the sensed data with the locations at which the sensed data was sampled using signals from location signal generation circuit 138. The data may be sampled, for example, at 1 second intervals. The correlated data is stored in memory (e.g., memory card 114) for later analysis by office computer 112. DPU 116 may be configured to not calculate yield data based upon an indication that the combine is not harvesting (e.g., header position is above a threshold position). This indication may also be used to separate passes through the field.

To accurately correlate the location data with the sensed characteristic data, DPU 116 is preferably programmed with variables, which may be set by the operator, which indicate the distance and direction between GPS antenna 142 and the sampled location of the field (i.e., between antenna 142 and the combine's header or the tractor's implement). This information is used as an offset to correct the location data stored with the sensed data. Also, to compensate for the time required for grain entering the header of the combine to reach the flow sensor 152, DPU 116 is programmed with a delay value (e.g., 10 seconds). Sensed data is correlated with the location data received 10 seconds earlier. Thus, no data will be sensed and no data will be plotted until 10 seconds after harvesting starts. In one embodiment, DPU 116 maintains a buffer of the last 20 positions received, and selects a position to use based upon the delay value.

The characteristic data and correlated location data are used to produce a display signal in real-time which, when applied to display 128, generates visible indicia of the characteristic data at corresponding locations of map 404. DPU 116 gathers characteristic data over "square" areas of the field where the sides of the square are substantially equal to the width of cut of the combine (or the width of the implement). Other shapes or blocks could also be used such as rectangles where the width is equal to the width of cut and the length is equal to the distance traversed in a predetermined time interval. Data within each data block is automatically processed or filtered (e.g., averaged) before being displayed. Averaging data as it is plotted eliminates the need to plot every data point, thereby decreasing visual noise on display 128. If desired, data representative of the blocks could be stored in memory rather than the raw data to reduce the memory storage and subsequent processing requirements. The average value of the data in each data block, and location data associated with the data block (appropriately scaled), are used to produce the display signal applied to display 128. In response, display 128 generates visible data blocks 408 which include visible indicia of the average characteristic value at corresponding locations of map 404.

Characteristic data may be visually represented on display 128 in several ways. In a preferred embodiment, distinguishable colors represent different ranges of the average data in each visible data block. For example, the colors red, orange, yellow, green, cyan, blue and violet may represent increasing ranges of average yield. Legend 410 displays each color and its associated yield range: below 25 (red); 25–49 (orange); 50–74 (yellow); 75–99 (green); 100–124 (cyan); 125–150 (blue); and above 150 bu/acre of corn (violet). When a moisture map is displayed, the default colors and ranges are: 0–7% (red); 7–14% (orange); 14–21% (yellow); 21–28% (green); 29–35% (cyan); 35–42% (blue); and above 42% (violet). The ranges and colors could also be selectable by the user. The range represented by each color is represented by legend 410 displayed within legend display area 403.

In one embodiment, the user selects an average value of the characteristic for the field and the ranges are based on the average value, with green centered at the average. For example, each color may represent a yield range of 5 bu/acre if the selected average yield is 50 bu/acre or less, a range of 10 bu/acre if the selected average yield is 50 to 125 bu/acre, or a range of 15 bu/acre if the selected average yield is 125 bu/acre or more. In each case, the range limits are rounded to the next whole number (e.g., green =48–53 bu/acre for a selected average yield of 50 bu/acre), and out of range values are displayed using the appropriate end color (i.e., red or violet). Alternatively, ranges may be represented by alpha-numeric characters or by different light intensity levels or grey scales.

Once geo-referenced digital maps of a field have been stored in memory (e.g., memory card 114) as described above, DPU 116 or processor 200 may read the correlated farming data from the memory and cause a map to be plotted off-line on display 128 or 204, respectively. The map includes representations of the characteristic data. The map is generated in a manner similar to the manner in which DPU 116 generates a map in real-time, except that the real-time position of the vehicle is not shown on the map, and the data may be plotted in any sequence and in any time-frame.

The correlated farming data may also be used to perform functions such as generating prescription maps or variable-rate application signals. For example, if the farming data indicates that areas of a field have varying nutrient concentration levels, processor 200 could generate a fertilizer prescription map which includes relatively high application rates for areas of the field with low nutrient levels and relatively low application rates for areas of the field with high nutrient levels. This prescription map would balance the need to adequately fertilize the field while minimizing the amount of fertilizer applied. The prescription map could be provided to DPU 116 via memory card 114, and DPU 116 could generate commands based upon the map data and apply the commands to variable-rate controllers 148.

The site-specific farming data, however, may include valid and spurious farming data in both the characteristic data and the location data. The spurious farming data may adversely effect the functions being performed. For example, spurious location data may cause DPU 116 or processor 200 to generate display signals which cause characteristic data correlated with the spurious location data to be plotted at the wrong location of display 128 or 204, respectively. Spurious characteristic data may cause DPU 116 or processor 200 to generate display signals which cause the characteristic data to be plotted using a color or light-intensity level corresponding to an incorrect data range. Spurious farming data may also adversely effect prescription maps and variable-rate application signals generated using the spurious farming data.

The effect of spurious farming data may depend on the degree to which the spurious farming data differs from the correct values. For example, spurious location data which represents a geographic area far from a field (e.g., no GPS positioning signals received) may cause DPU 116 or processor 200 to change the scale factor used to plot the field on display 128 or 204. In contrast, spurious location data which includes only a small error component (e.g., no DGPS correction signal received) may cause DPU 116 or processor 200 to plot the characteristic data correlated with the spurious location data at the wrong location in the field. Also, for example, the effect of spurious yield points on average yield may depend on the magnitude of the error.

Figure 5:
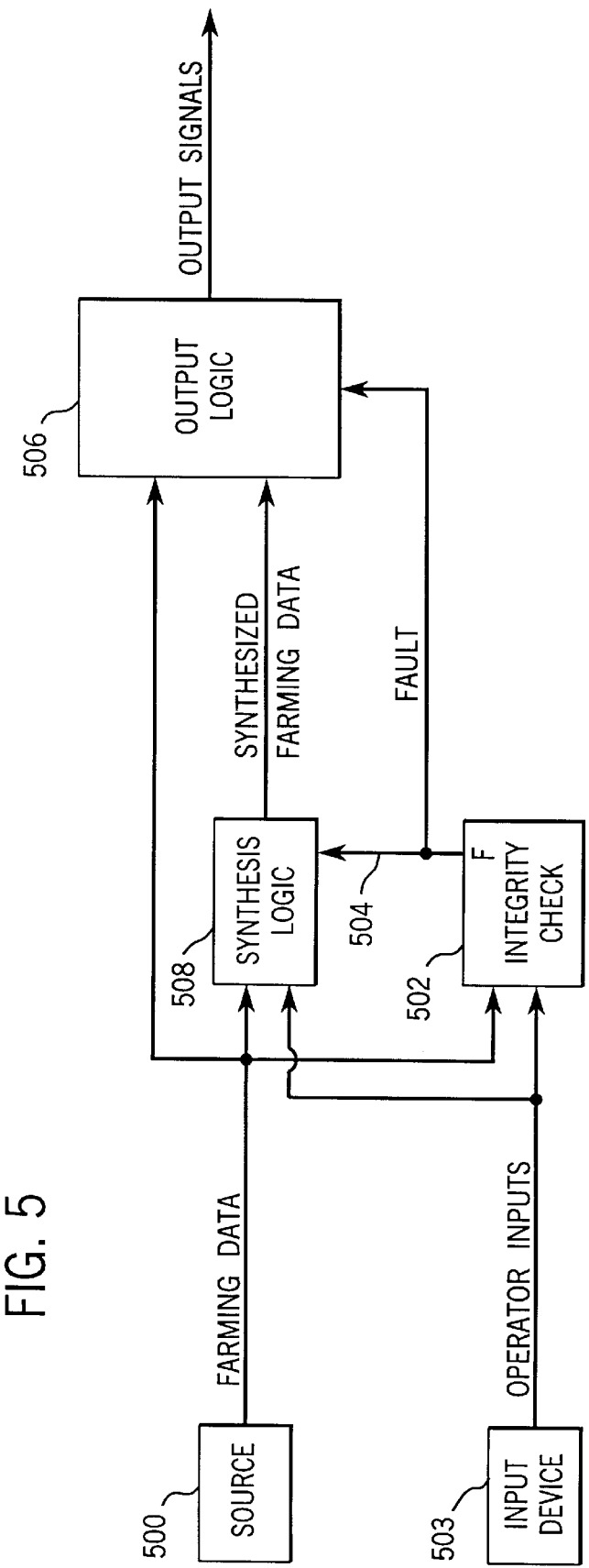
FIG. 5 is a schematic representation of programmed logic circuitry used by the site-specific farming system to accommodate spurious farming data.

As shown generally in FIG. 5, site-specific farming system 100 minimizes the adverse effects associated with spurious farming data by identifying the spurious farming data, synthesizing farming data to replace the spurious farming data and using the synthesized data instead of the spurious farming data to perform various functions of the farming system. The synthesized farming data is generated using information which exists within the valid farming data. The valid farming data can be used to predict or estimate the correct values used to replace the spurious farming data because of relationships which exist within the valid farming data.

Many relationships which exist within valid farming data can be exploited to generate synthesized farming data. Some relationships exist between valid farming data within the same layer. Referring back to FIG. 3, longitude and latitude coordinates of sequential data points relate to each other because they represent locations of a vehicle in a field at sequential sample times. For example, if a spurious latitude coordinate of 12.3456789 was stored with Data Point No. 4, a latitude coordinate to replace it can be synthesized by interpolating the position coordinates of surrounding data points, or by predicting or estimating the value using the surrounding data. Sequential characteristic data within a layer relate to each other since adjacent locations within a field typically have the same or similar characteristics. For example, if a spurious moisture content of 99.9% was stored with Data Point No. 4, a moisture content to replace it can be synthesized by interpolating or averaging the moisture content data of surrounding data points, or by predicting or estimating the value using surrounding data points. Although the synthesized value might not be completely accurate (e.g., a moisture content of 16.5 could be predicted for Data Point No. 4 based upon the average of the 17.1 and 15.9 moisture contents of Data Points Nos. 3 and 5, respectively, instead of the actual sensed value of 16.4), the synthesized value may well be more accurate than a default value.

Other relationships exist between valid farming data within different layers. For example, assume that no crop can grow in an area of a field having very highly compacted soil. If yield data associated with Data Point No. 4 is identified as spurious, and the soil compaction associated with the location of Data Point No. 4 indicates that the soil was too compacted to grow any crop, a yield data point of 0 can be synthesized for Data Point No. 4. Other relationships are known to exist between valid farming data within a single layer and within different layers, and other relationships will become known as site-specific farming research continues. The present invention allows current and future knowledge about these relationships to be utilized to synthesize farming data.

The elements shown in FIG. 5 (or portions of each element) may be performed by DPU 116, by processor 200 or by both DPU 116 and processor 200. For example, in one embodiment, DPU 116 stores raw (i.e., unprocessed) characteristic and location data in memory card 114, and processor 200 performs integrity checks on the raw data. In another embodiment, DPU 116 performs integrity checks on the characteristic and location data before storing the processed data in memory card 114. In yet another embodiment, DPU 116 performs some integrity checks on the raw data while processor 200 performs other integrity checks on the partially processed data. Thus, the steps described below may be performed by DPU 116, by processor 200, or by a combination of DPU 116 and processor 200.

Site-specific farming data is received from a source 500. In one embodiment, GPS positioning signals are received by location signal generation circuit 138 and the location data is generated from the positioning signals. DGPS correction signals are also received by location signal generation circuit 138 and are combined with the positioning signals to improve the accuracy of the location data. Characteristic signals are received from sensing circuits (e.g., flow sensor 152, moisture sensor 154, application sensors 150) and characteristic data is generated from the characteristic signals. In another embodiment, the characteristic and location data were previously stored on memory card 114, and the farming data is read from memory card 114.

Once the farming data is received, integrity checks 502 are performed to determine which portions of the farming data are valid and which are spurious. Integrity checks 502 may include one or more tests, and the tests which are used depend upon whether the farming data is location data or characteristic data. Some of the tests are performed automatically, while others require operator input using an input device 503. Also, integrity checks 502 may be performed on individual data points, or may be performed on blocks of data.

The following tests may be performed to check the integrity of a sequence of location data points which were gathered as an agricultural vehicle moved through a field:

1. Each location data point may be identified as spurious when the location in the field represented by the current location data point is separated from the location represented by the previous location data point by more than a predetermined distance. The predetermined distance may be a fixed value which exceeds the maximum distance the vehicle can travel during a sample period (e.g., 100 meters), or may be a dynamic value set according to the vehicle speed and the sample period. The vehicle speed may be sensed speed or a calculated speed based upon the time derivative of previous location data points.

2. Each location data point may be identified as spurious when the location in the field represented by the current location data point lies outside of the defined boundaries of the field being worked.

3. Each location data point may be identified as spurious when the location data point was generated using GPS positioning signals received from fewer than a predetermined number of satellites. Generally, signals from at least four satellites are necessary to generate a valid location data point. However, if the altitude is known, only three satellite signals are needed.

4. Each location data point may be identified as spurious when the location data point was generated without using correction signals. Location data generated without DGPS signals may include an error component on the order of 100 meters.

5. Each location data point may be identified as spurious when the location data point corresponds to a value which indicates that location signal generation circuit 138 was not functioning. For example, latitude and longitude coordinates of (0,0) may indicate that location signal generation circuit 138 was not powered.

Figure 6A:
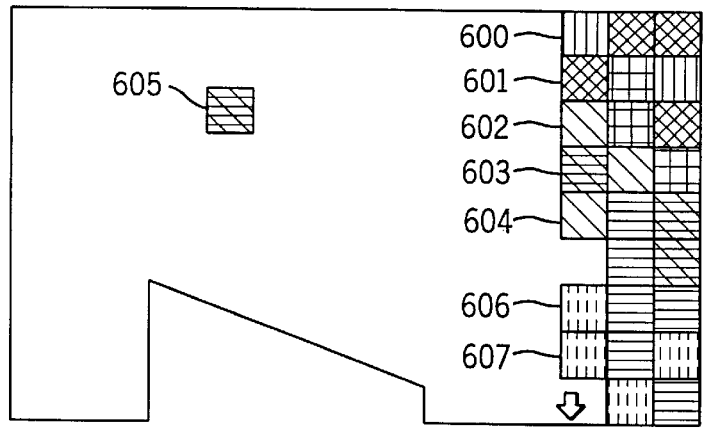
FIGS. 6A to 6C show a sequence of maps of a farming field generated from digital memory configured with spurious characteristic and location data which is identified and replaced with synthesized characteristic and location data.
Figure 6B:
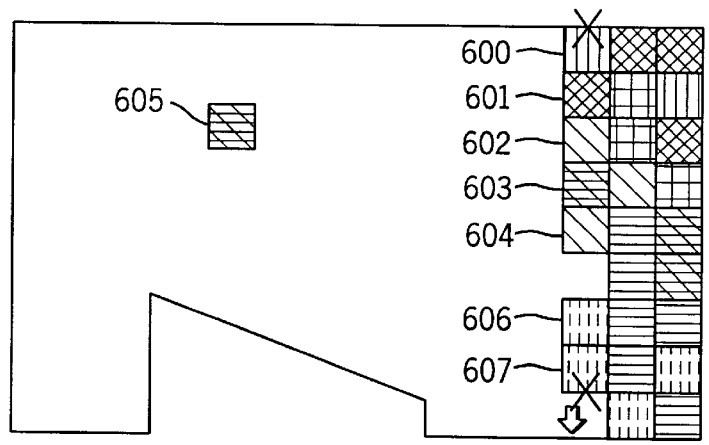

6. The following includes three steps. First, correlated characteristic and location data is used to generate a display signal which causes a display to generate visible indicia of the characteristic data. In the example shown in FIG. 6A, the data is represented by a sequence of blocks 600–607 which appear in the order in which the data was received and, optionally, stored in memory. Block 605 visually indicates that location data associated with block 605 is spurious. Second, an operator input device such as GUI 122 (e.g., a mouse) is used to define a pass of the vehicle in the field by marking the starting and ending points of the pass (the "X"s near blocks 600 and 607 in FIG. 6B). Third, DPU 116 or processor 200 identifies the location data as spurious by comparing the location of the block with a line defined by the starting and ending points of the pass. Since block 605 does not lie along the line of the pass, the location data associated with block 605 is identified as spurious. Alternatively, this test may be performed without requiring operator intervention by defining each pass based upon the pass numbers, or based upon the header position signals.

7. Another test includes two steps. First, correlated characteristic and location data is used to generate a display signal which causes a display to generate visible indicia of the characteristic data. In the example shown in FIG. 6A, the data is represented by a sequence of blocks 600–607 which appear in the order in which the data was received. Block 605 visually indicates that location data associated with block 605 is spurious. Second, an operator input device such as GUI 122 (e.g., a mouse) is used to mark blocks located in the wrong place (e.g., block 605). In one embodiment, the operator identified the block as spurious as it is plotted in real-time using an input signal from user interface 118 (e.g., by pressing a button or saying a word such as "Bad!" which is input by voice communication interface 126).

The following tests may be performed to check the integrity of a sequence of characteristic data points which were gathered as an agricultural vehicle moved through a field:

1. Each characteristic data point may be identified as spurious when the characteristic data point is outside of a defined range or is changing too quickly. The range or rate limits may be fixed or may be set by an operator.

2. Each characteristic data point may be identified as spurious when a predetermined number of sequential characteristic data points have remained constant.

Referring back to FIG. 5, a fault signal 504 indicates whether the farming data is valid or spurious. Valid farming data is used by output logic 506 to generate output signals which perform a function. However, if the farming data is spurious, the output logic 506 replaces the spurious farming data with synthesized farming data generated by synthesis logic 508. The synthesized farming data may optionally be used to over-write the spurious farming data in memory.

Synthesis logic 508 generates synthesized farming data in several ways, and the technique used depends upon whether the data is location or characteristic data. For example, the following techniques may be used to generate synthesized location data used to replace the spurious location data:

1. Synthesized location data may be generated by interpolating the valid location data. Interpolation generally involves estimating a value between two or more known values. For example, assume the farming data is plotted in FIG. 6 and block 605 has been identified as having spurious location data by a test described above. The location data associated with blocks 604 and 606 include valid location data points stored before and after the spurious location data points of block 605. Thus, the location of data of blocks 604 and 606 may be interpolated to synthesize location data points corresponding to block 605. The interpolation results in location data representing a location between blocks 604 and 606. In an alternative embodiments, if the valid location data includes data on either "side" of the spurious location data (i.e., from the previous and next passes through a field), the valid location data on either side of the spurious location data could also be interpolated to generate synthesized location data.

2. Synthesized location data may be generated based only upon valid location data that preceded the spurious location data (e.g., location data associated with blocks 600–604 in FIG. 6A). Synthesis based on only preceding location data may be used, for example, in a real-time display where no valid location data following the spurious location data has yet been received. The valid location data may be used to predict a speed (i.e., time derivative of valid location data points preceding the spurious data) and a heading (i.e., a vector between two valid location data points). The preceding location data, speed and heading may be used to generate the synthesized location data points.

3. Synthesized location data may be generated by determining the locations of a number of passes in the field based upon the valid location data and using the locations of the passes to generate synthesized location data. For example, location data in a current pass will typically be located at a certain distance (e.g., the pass width) from the previous pass. This technique is based on the geographic relationships of adjacent passes through a field (which are generally parallel).

4. After spurious location data is identified using Test #6 described above, synthesized location data may be generated based upon location data which corresponds to the line which runs between the starting and ending points of the pass. For example, the location data corresponding to block 605 in FIG. 6 can be synthesized based upon the location data of the line.

Figure 6C:
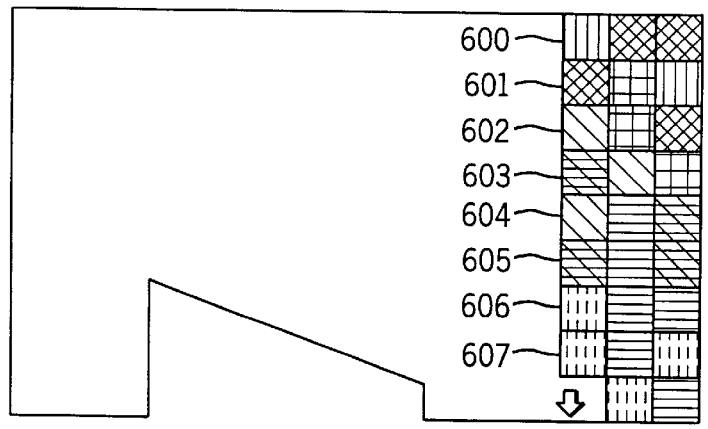

5. After spurious location data is identified using Test #7 described above, synthesized location data may be generated by allowing an operator to move or "drag" the data block marked as spurious to a new location. For example, after using a mouse to select block 605, the operator may drag the block to the correct location between blocks 604 and 606 as shown in FIG. 6C. The location data may then be synthesized based upon the new location.

The following techniques can be used to generate the synthesized characteristic data used to replace the spurious characteristic data:

1. Synthesized characteristic data may be generated by interpolating the valid characteristic data as described above in relation to the location data.

2. Synthesized characteristic data may be generated using only the valid characteristic data preceding the spurious characteristic data as described above in relation to the location data.

3. Synthesized characteristic data may be generated based upon another layer of site-specific farming data representative of a second characteristic of the field. For example, assume a certain field shows a very strong relationship between soil compaction and yield data, and the site-specific farming data includes a yield map and a soil compaction map. Also assume yield module 155 had an intermittent fault during harvest that caused some yield data to be spurious. In this situation, synthesized yield data may be generated using the soil compaction data which corresponds to the same locations as the spurious yield data based upon the relationship between the soil compaction data and yield data.

In any of the above synthesizing techniques, farming system 100 may be configured to use synthesized data to replace only a portion of the spurious data points before switching to a default value. Switching to a default value recognizes that synthesized data may become less accurate as the time or the number of spurious data points increases since the last valid data was received.

Referring back to FIG. 5, output logic 506 uses fault signal 504 to select between the valid and the synthesized farming data, and performs functions using output signals generated from the valid and synthesized farming data. For example, in the example shown in FIG. 6, after generating the synthesized location data used to replace the spurious location data of block 605, output logic 506 may use the valid and the synthesized location data to generate display signals which produce the display shown in FIG. 6C.

The use of synthesized farming data to replace spurious farming data may improve the accuracy of the functions performed by site-specific farming systems. In addition, the use of synthesized farming data may increase the credibility and confidence that farmers place in the systems. For example, a farmer who sees a display of his field with missing data points, or points located in an ocean, may very well lose confidence in the system.

While the embodiments illustrated in the FIGURES and described above are presently preferred, it should be understood that these embodiments are offered by way of example only. For example, the functions described above may be performed on the vehicle or in an office, and different techniques for integrity checking and synthesizing farming data may be used. The invention is not intended to be limited to any particular embodiment, but is intended to extend to various modifications that nevertheless fall within the scope of the appended claims.

What is claimed is:

1. A method of performing a function of a site-specific farming system in response to site-specific farming data, the farming data including characteristic data representative of a spatially-variable characteristic of an agricultural field at a plurality of locations within the field and location data representative of the plurality of locations, the farming data including valid farming data and spurious farming data, comprising the steps of:

receiving the site-specific farming data from a source;

integrity checking the received site-specific farming data to identify the valid farming data and the spurious farming data;

generating synthesized farming data based upon the valid farming data and replacing at least a portion of the spurious farming data with the synthesized farming data; and performing the function of the site-specific farming system in response to the valid farming data and the synthesized farming data.

2. The method of claim 1, wherein the receiving step includes receiving positioning signals from a plurality of satellites and generating the location data therefrom.

3. The method of claim 2, wherein the receiving step further includes receiving correction signals and combining the correction signals with the positioning signals to improve the accuracy of the location data.

4. The method of claim 3, wherein the receiving step further includes receiving characteristic signals representative of the spatially-variable characteristic of the field and generating the characteristic data therefrom.

5. The method of claim 1, wherein the receiving step includes reading the characteristic data and the respective location data from a digital memory.

6. The method of claim 5, wherein the digital memory includes a removable memory card.

7. The method of claim 1, wherein the farming data includes a plurality of location data points, and the integrity checking step includes comparing a current location data point representative of a current location within the field with a previous location data point representative of a previous location and identifying the current location data point as spurious when the current location is more than a predetermined distance from the previous location.

8. The method of claim 1, wherein the farming data includes a plurality of location data points, and the integrity checking step includes comparing each location data point representative of one of the plurality of locations with boundary data representative of the boundaries of the field and identifying the location data point as spurious when the one location lies outside of the boundaries.

9. The method of claim 1, wherein the farming data includes a plurality of location data points and a plurality of respective status values, the respective status values based upon the number of satellites from which positioning signals were received and used to generate the location data points, and the integrity checking step includes identifying each location data point as spurious when the location data point was generated using positioning signals from fewer than a predetermined number of satellites.

10. The method of claim 9, wherein the respective status values are also based upon whether correction signals were received and used to improve the accuracy of the location data points, and the integrity checking step further includes identifying each location data point as spurious when the location data point was generated without the correction signals.

11. The method of claim 1, wherein the farming data includes a plurality of characteristic data points, and the integrity checking step includes comparing each characteristic data point with range limits and identifying the characteristic data point as spurious when outside of the range limits.

12. The method of claim 1, wherein the farming data includes a plurality of characteristic data points, and the integrity checking step includes identifying the characteristic data points as spurious when a predetermined number of sequential characteristic data points remain constant.

13. The method of claim 1, wherein the valid farming data and the spurious farming data includes valid location data and spurious location data, respectively, and the generating step includes interpolating the valid location data to generate synthesized location data used to replace at least a portion of the spurious location data.

14. The method of claim 13, wherein the valid location data includes a first valid location data point stored before the spurious location data and a second valid location data point stored after the spurious location data, and the interpolation is based upon the first and the second valid location data points.

15. The method of claim 1, wherein the valid farming data and the spurious farming data includes valid location data and spurious location data, respectively, the valid location data including at least two valid location data points stored before the spurious location data, and the generating step includes using the two valid location data points to generate synthesized location data used to replace at least a portion of the spurious location data.

16. The method of claim 15, wherein the two valid location data points are used to predict a speed and a heading, and the speed and the heading are used to generate the synthesized location data.

17. The method of claim 1, wherein the valid farming data and the spurious farming data includes valid location data and spurious location data, respectively, and the generating step includes defining a plurality of passes of the field based upon the valid location data and using the passes to generate synthesized location data used to replace at least a portion of the spurious location data.

18. The method of claim 1, wherein the integrity checking step includes:

generating a display signal based upon the characteristic data and the location data which, when applied to an electronic display, generates visible indicia of the characteristic data at respective locations in a display area of the electronic display;

defining a pass of the field based upon actuations of an operator input device, the pass including a starting point and an ending point defining a line therebetween; and identifying spurious location data based upon the relationship between the line and the location data corresponding to the pass.

19. The method of claim 18, wherein the generating step includes using the line to generate synthesized location data used to replace at least a portion of the spurious location data.

20. The method of claim 1, wherein the integrity checking step includes:

generating a display signal based upon the characteristic data and the location data which, when applied to an electronic display, generates visible indicia of the characteristic data at respective locations in a display area of the electronic display; and identifying spurious location data based upon actuations of an operator input device used to identify the visible indicia of the characteristic data corresponding to the spurious location data.

21. The method of claim 20, wherein the generating step includes:

moving the identified visible indicia of the characteristic data corresponding to the spurious location data to a new location based upon further actuations of the operator input device; and using the new location to generate synthesized location data to replace at least a portion of the spurious location data.

22. The method of claim 1, wherein the valid farming data and the spurious farming data includes valid characteristic data and spurious characteristic data, respectively, and the generating step includes interpolating the valid characteristic data to generate synthesized characteristic data used to replace at least a portion of the spurious characteristic data.

23. The method of claim 22, wherein the valid characteristic data includes a first valid characteristic data point stored before the spurious characteristic data and a second valid characteristic data point stored after the spurious characteristic data, and the interpolation is based upon the first and the second valid characteristic data points.

24. The method of claim 1, wherein the valid farming data and the spurious farming data includes valid characteristic data and spurious characteristic data, respectively, and the farming data also includes second characteristic data representative of a second spatially-variable characteristic of the field, and the generating step includes using the second characteristic data to generate synthesized characteristic data used to replace at least a portion of the spurious characteristic data.

25. The method of claim 1, wherein the performing step includes generating a statistical value based upon a statistical analysis of the valid farming data and the synthesized farming data.

26. The method of claim 1, wherein the performing step includes generating a display signal based upon the valid farming data and the synthesized farming data which, when applied to an electronic display, generates visible indicia of the characteristic data at respective locations in a display area of an electronic display.

27. The method of claim 1, wherein the performing step includes generating a prescription map based upon the valid farming data and the synthesized farming data.

28. The method of claim 1, wherein the performing step includes generating variable rate application signals based upon the valid farming data and the synthesized farming data.

29. An apparatus for performing a function of a site-specific farming system in response to site-specific farming data, the farming data including characteristic data representative of a spatially-variable characteristic of an agricultural field at a plurality of locations within the field and location data representative of the plurality of locations, the farming data including valid farming data and spurious farming data, comprising:
   means for receiving the site-specific farming data from a source;
   means for integrity checking the received site-specific farming data to identify the valid farming data and the spurious farming data;
   means for generating synthesized farming data based upon the valid farming data and replacing at least a portion of the spurious farming data with the synthesized farming data; and
   means for performing the function of the site-specific farming system in response to the valid farming data and the synthesized farming data.

30. The apparatus of claim 29, wherein the means for receiving includes a location signal generation circuit configured to receive positioning signals from a plurality of satellites and to receive correction signals for combination with the positioning signals to generate the location data, and the means for receiving also includes a sensing circuit configured to generate characteristic signals representative of the spatially-variable characteristic of the field and to generate the characteristic data therefrom.

31. The apparatus of claim 29, wherein the means for receiving includes a memory card interface circuit configured to read the characteristic data and the location data from a removable memory card.

32. The apparatus of claim 29, wherein the farming data includes a plurality of location data points, and the means for integrity checking includes a processing circuit configured to compare a current location data point representative of a current location within the field with a previous location data point representative of a previous location and to identify the current location data point as spurious when the current location is more than a predetermined distance from the previous location.

33. The apparatus of claim 29, wherein the farming data includes a plurality of location data points, and the means for integrity checking includes a processing circuit configured to compare each location data point representative of one of the plurality of locations with boundary data representative of the boundaries of the field and to identify the location data point as spurious when the one location lies outside of the boundaries.

34. The apparatus of claim 29, wherein the farming data includes a plurality of location data points and a plurality of respective status values, the respective status values based upon the number of satellites from which positioning signals were received and used to generate the location data points and upon whether correction signals were received and used to improve the accuracy of the location data points, and the means for integrity checking includes a processing circuit configured to identify each location data point as spurious when the location data point was generated using positioning signals from fewer than a predetermined number of satellites or was generated without the correction signals.

35. The apparatus of claim 29, wherein the farming data includes a plurality of characteristic data points, and the means for integrity checking includes a processing circuit configured to compare each characteristic data point with range limits and to identify the characteristic data point as spurious when outside of the range limits.

36. The apparatus of claim 29, wherein the valid farming data and the spurious farming data includes valid location data and spurious location data, respectively, and the means for generating includes a processing circuit configured to interpolate the valid location data to generate synthesized location data used to replace at least a portion of the spurious location data.

37. The apparatus of claim 29, wherein the valid farming data and the spurious farming data includes valid location data and spurious location data, respectively, the valid location data including at least two valid location data points stored before the spurious location data, and the means for generating includes a processing circuit configured to use the two valid location data points to generate synthesized location data to replace at least a portion of the spurious location data.

38. The apparatus of claim 29, wherein the valid farming data and the spurious farming data includes valid location data and spurious location data, respectively, and the means for generating includes defining a plurality of passes of the field based upon the valid location data and using the passes to generate synthesized location data to replace at least a portion of the spurious location data.

39. The apparatus of claim 29, wherein:
   the means for integrity checking includes means for generating a display signal based upon the characteristic data and the location data which, when applied to an electronic display, generates visible indicia of the characteristic data at respective locations in a display area of the electronic display, means for defining a pass of the field based upon actuations of an operator input device, the pass including a starting point and an ending point defining a line therebetween, and means for identifying spurious location data based upon the relationship between the line and the location data corresponding to the pass; and
   the means for generating includes means for using the line to generate synthesized location data used to replace at least a portion of the spurious location data.

40. The apparatus of claim 29, wherein:
   the means for integrity checking includes means for generating a display signal based upon the characteristic data and the location data which, when applied to an electronic display, generates visible indicia of the characteristic data at respective locations in a display area of the electronic display and means for identifying spurious location data based upon actuations of an operator input device used to identify the visible indicia of the characteristic data corresponding to the spurious location data; and
   the means for generating includes means for moving the identified visible indicia of the characteristic data corresponding to the spurious location data to a new location based upon further actuations of the operator input device and means for using the new location to generate synthesized location data used to replace at least a portion of the spurious location data.

41. The apparatus of claim 29, wherein the valid farming data and the spurious farming data includes valid characteristic data and spurious characteristic data, respectively, and the means for generating includes a processing circuit configured to interpolate the valid characteristic data to generate synthesized characteristic data used to replace at least a portion of the spurious characteristic data.

42. The apparatus of claim 29, wherein the valid farming data and the spurious farming data includes valid characteristic data and spurious characteristic data, respectively, and the farming data also includes second characteristic data representative of a second spatially-variable characteristic of the field, and the means for generating includes a processing circuit configured to use the second characteristic data to generate synthesized characteristic data used to replace at least a portion of the spurious characteristic data.

43. The apparatus of claim 29, wherein the means for performing includes means for generating a statistical value based upon a statistical analysis of the valid farming data and the synthesized farming data.

44. The apparatus of claim 29, wherein the means for performing generates a display signal based upon the valid farming data and the synthesized farming data which, when applied to an electronic display, generates visible indicia of the characteristic data at respective locations in a display area of an electronic display.

45. The apparatus of claim 29, wherein the means for performing generates a prescription map based upon the valid farming data and the synthesized farming data.

46. The apparatus of claim 29, wherein the means for performing generates variable rate application signals based upon the valid farming data and the synthesized farming data.

47. A method of performing a function of a site-specific farming system in response to site-specific farming data, the farming data including characteristic data representative of a spatially-variable characteristic of an agricultural field at a plurality of locations within the field and location data representative of the plurality of locations, the characteristic data including valid characteristic data and spurious characteristic data and the location data including valid location data and spurious location data, comprising the steps of:

receiving the characteristic data and the location data from at least one source;

integrity checking the received characteristic data to identify the valid characteristic data and the spurious characteristic data;

integrity checking the received location data to identify the valid location data and the spurious location data;

generating synthesized characteristic data based upon the valid characteristic data and replacing at least a portion of the spurious characteristic data with the synthesized characteristic data;

generating synthesized location data based upon the valid location data and replacing at least a portion of the spurious location data with the synthesized location data; and performing the function of the site-specific farming system in response to the valid characteristic data, the synthesized characteristic data, the valid location data and the synthesized location data.

* * * * *